United States Patent
Choi et al.

(10) Patent No.: US 9,866,875 B2
(45) Date of Patent: Jan. 9, 2018

(54) LOW COMPLEXITY ENTROPY-ENCODING/DECODING METHOD AND APPARATUS

(71) Applicant: SAMSUNG ELECTRONICS CO., LTD., Suwon-si (KR)

(72) Inventors: Woong-Il Choi, Hwaseong-si (KR); Woo-jin Han, Suwon-si (KR); Tammy Lee, Seoul (KR); Sun-il Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/428,696

(22) Filed: Feb. 9, 2017

(65) Prior Publication Data

US 2017/0155926 A1    Jun. 1, 2017

Related U.S. Application Data

(63) Continuation of application No. 15/155,810, filed on May 16, 2016, now Pat. No. 9,602,845, which is a continuation of application No. 13/080,144, filed on Apr. 5, 2011, now Pat. No. 9,369,736.

(60) Provisional application No. 61/320,826, filed on Apr. 5, 2010.

(30) Foreign Application Priority Data

Oct. 20, 2010   (KR) .................. 10-2010-0102506

(51) Int. Cl.
*H04N 19/30*    (2014.01)
*H04N 19/70*    (2014.01)
*H04N 19/91*    (2014.01)
*H04N 19/176*   (2014.01)

(52) U.S. Cl.
CPC ............. *H04N 19/91* (2014.11); *H04N 19/30* (2014.11); *H04N 19/70* (2014.11); *H04N 19/176* (2014.11)

(58) Field of Classification Search
None
See application file for complete search history.

(56) References Cited

U.S. PATENT DOCUMENTS

| 5,107,345 A | 4/1992 | Lee |
| 5,367,629 A | 11/1994 | Chu et al. |
| 6,026,191 A | 2/2000 | Ohara |
| 6,195,465 B1 | 2/2001 | Zandi et al. |

(Continued)

FOREIGN PATENT DOCUMENTS

| CA | 2701877 A1 | 4/2009 |
| CA | 2891093 A1 | 10/2011 |

(Continued)

OTHER PUBLICATIONS

International Search Report dated Dec. 15, 2011 in counterpart international application No. PCT/KR2011/002386.

(Continued)

*Primary Examiner* — Christopher S Kelley
*Assistant Examiner* — Kaitlin A Retallick
(74) *Attorney, Agent, or Firm* — Sughrue Mion, PLLC

(57) ABSTRACT

Entropy encoding and entropy decoding of image data are respectively performed whereby context modeling is performed on a context unit of blocks of the image data based on a context model of a previously encoded or decoded block.

1 Claim, 11 Drawing Sheets

(56) References Cited

U.S. PATENT DOCUMENTS

| | | | |
|---|---|---|---|
| 7,181,072 B2 | 2/2007 | Wang et al. | |
| 7,262,721 B2 | 8/2007 | Jeon et al. | |
| 7,460,041 B2 | 12/2008 | Yang et al. | |
| 7,577,305 B2 | 8/2009 | Srinivasan | |
| 7,706,622 B2 | 4/2010 | Kobayashi | |
| 7,792,193 B2 | 9/2010 | Tanizawa et al. | |
| 7,982,641 B1* | 7/2011 | Su | H03M 7/4006 341/107 |
| 7,995,849 B2 | 8/2011 | Raveendran et al. | |
| 8,345,752 B2 | 1/2013 | Lee et al. | |
| 2003/0016745 A1 | 1/2003 | Park et al. | |
| 2003/0128753 A1 | 7/2003 | Lee et al. | |
| 2003/0215014 A1 | 11/2003 | Koto et al. | |
| 2005/0008231 A1 | 1/2005 | Christopoulos et al. | |
| 2005/0041740 A1 | 2/2005 | Sekiguchi et al. | |
| 2005/0084013 A1 | 4/2005 | Wang et al. | |
| 2005/0114093 A1 | 5/2005 | Cha et al. | |
| 2005/0123207 A1 | 6/2005 | Marpe et al. | |
| 2005/0147169 A1 | 7/2005 | Wang et al. | |
| 2005/0169374 A1 | 8/2005 | Marpe et al. | |
| 2006/0146936 A1 | 7/2006 | Srinivasan | |
| 2006/0251330 A1 | 11/2006 | Toth et al. | |
| 2006/0262978 A1 | 11/2006 | Wang et al. | |
| 2007/0009047 A1 | 1/2007 | Shim et al. | |
| 2007/0098078 A1 | 5/2007 | Kim et al. | |
| 2007/0194953 A1 | 8/2007 | Cho | |
| 2007/0248163 A1 | 11/2007 | Zuo et al. | |
| 2007/0263718 A1 | 11/2007 | Sekiguchi et al. | |
| 2008/0055614 A1 | 3/2008 | Qiao et al. | |
| 2008/0069235 A1 | 3/2008 | Abe et al. | |
| 2008/0080620 A1 | 4/2008 | Lee et al. | |
| 2008/0112632 A1 | 5/2008 | Vos et al. | |
| 2008/0170793 A1 | 7/2008 | Yamada et al. | |
| 2008/0232706 A1 | 9/2008 | Lee et al. | |
| 2008/0310745 A1 | 12/2008 | Ye et al. | |
| 2009/0003716 A1 | 1/2009 | Sekiguchi et al. | |
| 2009/0079601 A1 | 3/2009 | Kawakami | |
| 2009/0080534 A1 | 3/2009 | Sekiguchi et al. | |
| 2009/0087110 A1 | 4/2009 | Tourapis et al. | |
| 2009/0232207 A1 | 9/2009 | Chen | |
| 2009/0245353 A1 | 10/2009 | Choi et al. | |
| 2009/0245668 A1 | 10/2009 | Fukuhara et al. | |
| 2010/0040148 A1* | 2/2010 | Marpe | H04N 19/176 375/240.16 |
| 2010/0098155 A1 | 4/2010 | Demircin et al. | |
| 2013/0148726 A1 | 6/2013 | Han et al. | |
| 2013/0343452 A1 | 12/2013 | Jeong et al. | |
| 2015/0249836 A1 | 9/2015 | Cho et al. | |
| 2015/0326879 A1 | 11/2015 | Alshina et al. | |
| 2017/0155926 A1 | 6/2017 | Choi et al. | |

FOREIGN PATENT DOCUMENTS

| | | |
|---|---|---|
| CN | 1698386 A | 11/2005 |
| CN | 1774722 A | 5/2006 |
| CN | 1784011 A | 6/2006 |
| CN | 1835595 A | 9/2006 |
| CN | 102934432 A | 2/2013 |
| EP | 1585338 A1 | 10/2005 |
| EP | 2608539 A2 | 6/2013 |
| EP | 2713618 B1 | 3/2015 |
| JP | 5506340 A | 9/1993 |
| JP | 8251590 A | 9/1996 |
| JP | 11164305 A | 6/1999 |
| JP | 2001145106 A | 5/2001 |
| JP | 2003179499 A | 6/2003 |
| JP | 2003230149 A | 8/2003 |
| JP | 2005513883 A | 5/2005 |
| JP | 2006211304 A | 8/2006 |
| JP | 2007174569 A | 7/2007 |
| JP | 2008527902 A | 7/2008 |
| JP | 2009504039 A | 1/2009 |
| JP | 2011526770 A | 10/2011 |
| KR | 20030009669 A | 2/2003 |
| KR | 1020040105872 A | 12/2004 |
| KR | 1020050045746 A | 5/2005 |
| KR | 1020050061396 A | 6/2005 |
| KR | 1020060027795 A | 3/2006 |
| KR | 10-2007-0006445 A | 1/2007 |
| KR | 10-2007-0051681 A | 5/2007 |
| KR | 1020070047523 A | 5/2007 |
| KR | 10-2008-0008923 A | 1/2008 |
| KR | 100842558 B1 | 6/2008 |
| KR | 10-2008-0068276 A | 7/2008 |
| KR | 10-2008-0107436 A | 12/2008 |
| RU | 2 273 112 C2 | 3/2006 |
| RU | 2 334 973 C1 | 9/2008 |
| RU | 2 335 845 C2 | 10/2008 |
| RU | 2339181 C1 | 11/2008 |
| WO | 2004/084123 A1 | 9/2004 |
| WO | 2008/020672 A1 | 2/2008 |
| WO | 2009021062 A1 | 2/2009 |
| WO | 2010002214 A2 | 1/2010 |
| WO | 2011/126277 A3 | 10/2011 |
| WO | 2011/126282 A3 | 10/2011 |

OTHER PUBLICATIONS

International Search Report dated Dec. 19, 2011 in counterpart international application No. PCT/KR2011/002389.
International Search Report dated Dec. 22, 2011 in counterpart international application No. PCT/KR2011/002383.
International Search Report dated Nov. 23, 2011 in counterpart international application No. PCT/KR2011/002384.
International Search Report dated Nov. 28, 2011 in counterpart international application No. PCT/KR2011/002377.
Notification of Transmittal of the International Search Report and the Written Opinion of the International Searching Authority dated Dec. 15, 2011 in counterpart international application No. PCT/KR2011/002386.
Notification of Transmittal of the International Search Report and the Written Opinion of the International Searching Authority dated Dec. 19, 2011 in counterpart international application No. PCT/KR2011/002389.
Notification of Transmittal of the International Search Report and the Written Opinion of the International Searching Authority dated Dec. 22, 2011 in counterpart international application No. PCT/KR2011/002383.
Notification of Transmittal of the International Search Report and the Written Opinion of the International Searching Authority dated Nov. 23, 2011 in counterpart international application No. PCT/KR2011/002384.
Notification of Transmittal of the International Search Report and the Written Opinion of the International Searching Authority dated Nov. 28, 2011 in counterpart international application No. PCT/KR2011/002377.
Written Opinion of the International Searching Authority dated Dec. 15, 2011 in counterpart international application No. PCT/KR2011/002386.
Written Opinion of the International Searching Authority dated Dec. 19, 2011 in counterpart international application No. PCT/KR2011/002389.
Written Opinion of the International Searching Authority dated Dec. 22, 2011 in counterpart international application No. PCT/KR2011/002383.
Written Opinion of the International Searching Authority dated Nov. 23, 2011 in counterpart international application No. PCT/KR2011/002384.
Written Opinion of the International Searching Authority dated Nov. 28, 2011 in counterpart international application No. PCT/KR2011/002377.
Communication, dated Sep. 3, 2013, issued by the Australian Patent Office in counterpart Australian Application No. 2011239059.
Communication, dated Sep. 3, 2013, issued by the Australian Patent Office in counterpart Australian Application No. 2011239137.
Communication dated Dec. 9, 2013 issued by the Russian Patent Office in counterpart Russian Patent Application No. 2012146753.

(56) References Cited

OTHER PUBLICATIONS

Communication dated Jan. 22, 2014 issued by the Russian Patent Office in counterpart Russian Patent Application No. 2012146749.
Communication from the Malaysian Patent Office dated May 15, 2014 in a counterpart Malaysian Application No. PI 2012004422.
Communication from the Malaysian Patent Office dated May 15, 2014 in a counterpart Malaysian Application No. PI 2012004418.
Communication from the Russian Patent Office dated Jul. 28, 2014, in a counterpart Russian application No. 2012146749/08(075112).
Communication from the Australian Patent Office dated Sep. 22, 2014 in a counterpart Australian Application No. 2011239059.
Woo-Jin Han, et al., "Improved Video Compression Efficiency Through Flexible Unit Representation and Corresponding Extension of Coding Tools", IEEE Trans. on CSVT. Dec. 2010, vol. 20, No. 12, pp. 1709-1720.
S. Naito, et al., "Efficient coding scheme for super high definition video based on extending H.264 high profile", Visual Communications and Image Processing 2007. Jan. 2006, SPIE—IS&T/vol. 6077, pp. 1-8.
Siwei Ma, et al., "High-definition Video Coding with Super-macroblocks", Visual Communications and Image Processing 2007. Jan. 2007, SPIE—IS&T/vol. 6508, pp. 1-12.
Ken McCann, et al. "Samsung's Response to the Call for Proposals on Video Compression Technology", JCT-VC of ITU-T SG16 WP3 and ISO/IEC JTC1/SC29/WG11, 1st Meeting. JCTVC-A124. Apr. 15-23, 2010, pp. 1-42.
Communication from the Korean Intellectual Property Office dated Dec. 11, 2014, in a counterpart Korean application No. 10-2010-0096920.
Communication from the Canadian Patent Office dated Oct. 17, 2014, in a counterpart Canadian Application No. 2795621.
Communication dated Feb. 3, 2015 by the Japanese Patent Office in related application No. 2013-503671.
Yu et al. "Low Bit Rate Video Coding Using Variable Block Size Model", Proc. of 1990 Int. Conf. on Acoustics, Speech, and Signal Processing (ICASSP-90), vol. 4, Apr. 1990, total 8 pages.
Martin et al. "Reduced entropy motion compensation using variable sized blocks", Proceeding of SPIE, vol. 3024, Jan. 10, 1997, total 8 pages.
Cheng, "Adaptive Transform Coding via Quadtree-Based Variable Blocksize DCT", Proc. of 1989 Int. Conf. on Acoustics, Speech, and Signal Processing (ICASSP-89), vol. 3, May 1989, total 8 pages.
"Further result on constraining transform candidate in Extended Block Sizes", Telecommunications Standardization Sector Study Group 16 Question 6 Video Coding Experts Group (VCEG), total 8 pages, retrieved from <http://wftp3.itu.int/av-arch/video-site/0906_LG/VCEG-AL19.zip>, Jul. 7, 2009.
Communication dated Feb. 3, 2015 by the Japaense Patent Office in related application No. 2013-503673.
Nakano et al., "Stream base high speed search method for JPEG encoding image", Image Informatio Media Academic Society, Feb. 26, 2005, vol. 29, No. 17 total 12 pages.
Communication dated Mar. 23, 2015 by the State Intellectual Property Office of PR China n related application No. 201180027751.7.
Communication dated Feb. 28, 2015 by the State Intellectual Property Office of PR China in related application No. 201180027746.6.
Communication dated May 5, 2015, issued by the State Intellectual Property Office of P.R. China in counterpart Chinese Application No. 201180027747.0.
Communication dated May 7, 2015, issued by the European Patent Office in counterpart European Application No. 11766128.0.
Communication dated Jul. 21, 2015, issued by the Japanese Intellectual Property Office in counterpart Japanese Application No. 2013-503671.
Communication dated Jul. 21, 2015, issued by the Japanese Intellectual Property Office in counterpart Japanese Application No. 2015-095272.
Communication dated Jul. 21, 2015, issued by the Japanese Intellectual Property Office in counterpart Japanese Application No. 2015-095273.
Communication dated Jul. 21, 2015, issued by the Japanese Intellectual Property Office in counterpart Japanese Application No. 2015-095274.
Communication dated Jul. 21, 2015, issued by the Japanese Intellectual Property Office in counterpart Japanese Application No. 2015-095275.
D. Marpe et al., "Context-based adaptive binary arithmetic coding in the H.264/AVC video compression standard", IEEE Transactions on Circuits and Systems for Video Technology, vol. 13, No. 7, Jul. 1, 2003, pp. 620-636, XP5512007.
Wiegan; "Editor's proposed revision of CD relative to JVT-D015d", 4. JVT Meeting; 61. MPEG Meeting; Jul. 22, 2002-Jul. 26, 2002; Klagenfurt,AT; (Joint Video Team of IS0/IEC JTC1/SC29/WG11 and ITU-T SG.16),, No. JVT-D017d2, Jul. 26, 2002, Total 154 pages, XP030005292.
Naito, S., et.al., "Efficient coding scheme for super high definition video based on extending H.264 high profile", Proc. of SPIE—IS&T Electronic Imaging, SPIE vol. 6077, Jan. 2006, pp. 607727-1-607727-8.
Communication dated Aug. 25, 2015 issued by Korean Intellectual Property Office in counterpart Korean Patent Application No. 10-2014-0148760.
Communication dated Aug. 25, 2015 issued by Korean Intellectual Property Office in counterpart Korean Patent Application No. 10-2015-0095376.
Communication dated Aug. 25, 2015 issued by Korean Intellectual Property Office in counterpart Korean Patent Application No. 10-2015-0095377.
Communication dated Sep. 15, 2015 issued by European Patent Office in counterpart European Patent Application No. 11766133.0.
Anonymous, "Test Model under Consideration", Joint Collaborative Team on Video Coding (JCT-VC) of ITU-T SG16 WP3 and ISO/IEC JTC1/SC29/WG11, 2nd Meeting, Jul. 21-28, 2010, 152 pages total, JCT-VC, Geneva, CH, Document JCTVC-B205.
Communication from the Indonesian Patent Office dated Apr. 19, 2016 in a counterpart Indonesian application No. 10-2010-0102506.
Communication from the Indonesian Patent Office dated Apr. 19, 2016 in a counterpart Indonesian application No. 10-2014-148744.
Communication from the Korean Intellectual Property Office dated Mar. 30, 2016 in a counterpart Korean application No. 10-2010-0085508.
Communication dated Apr. 12, 2016, issued by the Federal Service on Intellectual Property of Russia in counterpart Russian Application No. 2014149335/08.
Communication dated Jun. 3, 2016, issued by the State Intellectual Property Office of P.R. China in counterpart Chinese Application No. 201510217468.0.
Communication dated Jun. 3, 2016, issued by the State Intellectual Property Office of P.R. China in counterpart Chinese Application No. 201510217350.8.
Jaeil Kim et al., "Enlarging MB size for high fidelity video coding beyond HD", ITU—Telecommunications Standardization Sector Study Group 16 Question 6 Video Coding Experts Croup (VCEG) 36th Meeting: San Diego, USA, Oct. 8-10, 2008 Document VCEG-AJ21 Filename: VCEG-AJ21.doc (7 Pages Total).
Communication dated Aug. 18, 2016, from the Canadian Intellectual Property Office in counterpart application No. 2,891,099.
Communication dated Aug. 22, 2016, from the Canadian Intellectual Property Office in counterpart application No. 2,891,138.
Communication dated Aug. 22, 2016, from the Canadian Intellectual Property Office in counterpart application No. 2,891,093.
Communication dated Oct. 25, 2016, issued by the Korean Intellectual Property Office in corresponding Korean Application No. 10-2010-0065469.
Communication dated Jan. 5, 2017 issued by the State Intellectual Property Office of Peoples Republic of China in counterpart Chinese Application No. 201510217350.8.
Wien, M., "Variable Block-Size Transforms for Hybrid Video Coding", Dissertation der Rheinisch-Westfälischen Technischen Hochschule Aachen, Feb. 3, 2004, 183 pages total, XP 002481661.

(56) References Cited

OTHER PUBLICATIONS

Communication dated Jun. 5, 2017, issued by the State Intellectual Property Office of the People's Republic of China in counterpart Chinese Patent Application No. 201510217350.8.

Communication dated Jun. 8, 2017, issued by the Canadian Intellectual Property Office in counterpart Canadian Patent Application No. 2,891,099.

Communication dated Feb. 3, 2017 issued by the State Intellectual Property Office of P.R. China in counterpart Chinese Application No. 201510217468.0.

Communication dated Mar. 30, 2017 issued by the Korean Intellectual Property Office in counterpart Korean Application No. 10-2010-0102506.

Communication dated Feb. 27, 2017 issued by the Korean Intellectual Property Office in counterpart Korean Application No. 10-2011-0031289.

Communication dated Mar. 30, 2017 issued by Korean Intellectual Property Office in counterpart Korean Application No. 10-2014-0148744.

Communication dated Feb. 28, 2017 issued by Korean Intellectual Property Office in counterpart Korean Application No. 10-2017-0022468.

Communication dated Jul. 5, 2017, issued by the State Intellectual Property Office of P.R. China in counterpart Chinese Application No. 201510217468.0.

Communication dated Jun. 28, 2017, issued by the State Intellectual Property Office of P.R. China in counterpart Chinese Application No. 201510219883.

Communication dated Aug. 8, 2017, issued by the State Intellectual Property Office of P.R. China in counterpart Chinese Application No. 201510220011.5.

Communication dated Jul. 3, 2017, issued by the State Intellectual Property Office of P.R. China in counterpart Chinese Application No. 201610031642.7.

* cited by examiner

CODING UNIT (810)

PREDICTION UNIT (860)

LOW COMPLEXITY ENTROPY-ENCODING/DECODING METHOD AND APPARATUS

CROSS-REFERENCE TO RELATED PATENT APPLICATION

This application is a Continuation Application of U.S. application Ser. No. 15/155,810, filed on May 16, 2016, in the U.S. Patent and Trademark Office, which is a Continuation Application of U.S. application Ser. No. 13/080,144, filed on Apr. 5, 2011, in the U.S. Patent and Trademark Office, now U.S. Pat. No. 9,369,736, issued Jun. 14, 2016, which claims the benefit of U.S. Provisional Application No. 61/320,826, filed on Apr. 5, 2010, in the United States Patent and Trademark Office, and priority from Korean Patent Application No. 10-2010-0102506, filed on Oct. 20, 2010, in the Korean Intellectual Property Office, the disclosures of which are incorporated herein by reference in their entireties.

BACKGROUND

1. Field

Exemplary embodiments relate to an entropy-encoding and entropy-decoding method and apparatus, and more particularly, to a method and apparatus for entropy-encoding and entropy-decoding a predetermined syntax element generated by encoding an image.

2. Description of the Related Art

A codec, such as Moving Pictures Experts Group (MPEG)-4 H.264/MPEG-4 Advanced Video Coding (AVC), entropy-encodes/decodes a syntax element by using context-based adaptive variable length coding (CAVLC) and context-based adaptive binary arithmetic coding (CABAC). However, in the context-based adaptive entropy-encoding/decoding method described above, memory access should be frequently performed.

SUMMARY

The exemplary embodiments include a method and apparatus for efficiently performing entropy-encoding/decoding, and a computer readable recording medium having recorded thereon a computer program for executing the method.

According to an aspect of an exemplary embodiment, there is provided a method of entropy-encoding image data, the method including: setting a current context model for entropy-encoding a syntax element of a first block of the image data and a second context model for entropy-encoding a syntax element of a second block of the image data that is adjacent to the first block to be the same as a previous context model used to entropy-encode the syntax element of a previously encoded block that is adjacent to the first block; and entropy-encoding the syntax element of the first block and the syntax element of the second block based on the current context model.

The method may further include grouping the first block and the second block as a context unit, and the first block is a block that is encoded prior to the second block in the context unit.

The setting of the current context model may include setting a context index for entropy-encoding the syntax element of the first block to be the same as a context index used to entropy-encode the syntax element of the previously encoded block.

The entropy-encoding of the syntax element of the first block may include performing context-based adaptive binary arithmetic coding on the syntax element of the first block based on the context index.

The entropy-encoding of the syntax element of the first block may include performing arithmetic coding on the syntax element of the first block based on information that indicates a most probable symbol corresponding to the context index and information that indicates an occurrence probability of the most probable symbol.

The entropy-encoding of the syntax element of the first block may further include updating at least one of information that indicates the most probable symbol and information that indicates the occurrence probability of the most probable symbol based on a result of the arithmetic coding.

The entropy-encoding of the syntax element of the first block may further include performing context-based adaptive variable length coding (CAVLC) on the syntax element of the first block based on the context index.

According to another aspect of an exemplary embodiment, there is provided a method of entropy-decoding image data, the method including: setting a current context model for entropy-decoding a syntax element of a first block of the image data and a second context model for entropy-decoding a the syntax element of a second block of the image data that is adjacent to the first block to be the same as a previous context model used to entropy-decode the syntax element of a previously decoded block that is adjacent to the first block; and entropy-decoding the syntax element of the first block and the syntax element of the second block based on the current context model.

According to another aspect of an exemplary embodiment, there is provided an apparatus for entropy-encoding image data, the apparatus including: a context modeling unit that sets a current context model for entropy-encoding a syntax element of a first block of the image data and a second context model for entropy-encoding a the syntax element of a second block of the image data that is adjacent to the first block to be the same as a previous context model used to entropy-encode the syntax element of a previously encoded block that is adjacent to the first block; and an entropy encoder that entropy-encodes the syntax element of the first block and the syntax element of the second block based on the current context model.

According to another aspect of an exemplary embodiment, there is provided an apparatus for entropy-decoding image data, the apparatus including: a context modeling unit that sets a current context model for entropy-decoding a syntax element of a first block of the image data and a second context model for entropy-decoding a the syntax element of a second block of the image data that is adjacent to the first block to be the same as a previous context model used to entropy-decode the syntax element of a previously decoded block that is adjacent to the first block; and an entropy decoder that entropy-decodes the syntax element of the first block and the syntax element of the second block based on the current context model.

According to another aspect of an exemplary embodiment, there is provided a computer readable recording medium having embodied thereon a computer program for executing the method of entropy-encoding image data or the method of entropy-decoding image data.

BRIEF DESCRIPTION OF THE DRAWINGS

The above and other aspects will become more apparent by describing in detail exemplary embodiments thereof with reference to the attached drawings in which.

DETAILED DESCRIPTION OF EXEMPLARY EMBODIMENTS

Hereinafter, one or more exemplary embodiments will be described more fully with reference to the accompanying drawings. Expressions such as "at least one of," when preceding a list of elements, modify the entire list of elements and do not modify the individual elements of the list. In the present specification, an "image" may denote a still image for a video or a moving image, that is, the video itself.

Figure 1:
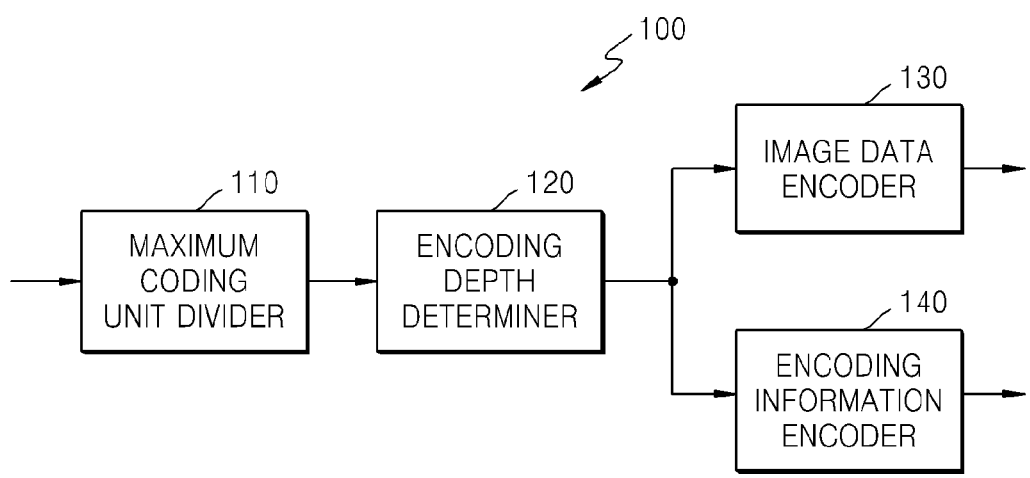
FIG. 1 is a block diagram of an apparatus that encodes an image, according to an exemplary embodiment.

FIG. 1 is a block diagram of an apparatus 100 that encodes an image, according to an exemplary embodiment.

Referring to FIG. 1, the apparatus 100 that encodes an image includes a maximum coding unit divider 110, an encoding depth determiner 120, an image data encoder 130, and an encoding information encoder 140.

The maximum coding unit divider 110 may divide a current frame or slice based on a maximum coding unit, which is a coding unit having a largest size among coding units of the current frame or slice. That is, the maximum coding unit divider 110 may divide the current frame or slice into at least one maximum coding unit.

According to an exemplary embodiment, a coding unit may be represented using a maximum coding unit and a depth. As described above, the maximum coding unit indicates a coding unit having the largest size from among coding units of the current frame, and the depth indicates a degree of hierarchically decreasing the coding unit. As a depth increases, a coding unit may decrease from a maximum coding unit to a minimum coding unit, wherein a depth of the maximum coding unit is a minimum depth and a depth of the minimum coding unit is a maximum depth. Since the size of a coding unit decreases, from the size of a maximum coding unit, as a depth of the coding unit increases, a sub coding unit of a kth depth may include a plurality of sub coding units of a (k+n)th depth (k and n are integers equal to or greater than 1).

According to an increase of the size of a frame to be encoded, encoding an image in a larger coding unit may produce a higher image compression ratio. However, if a large coding unit is used to exclusively encode an image, the image may not be efficiently encoded due to continuously changing image characteristics.

For example, when a smooth area such as the sea or sky is encoded, the larger the size of a coding unit, the more a compression ratio of the image may increase. However, when a complex area, such as people or buildings is encoded, the smaller the size of a coding unit, the more a compression ratio of the image may increase.

Accordingly, according to an exemplary embodiment, a maximum image coding unit and a maximum depth are set for each frame or slice. Accordingly, the maximum coding unit and the maximum depth for a first frame or slice may be different than the maximum coding unit and the maximum depth for a second frame or slice. Since a maximum depth denotes the maximum number of times by which a coding unit may decrease, the size of each minimum coding unit included in a maximum image coding unit may be variably set according to a maximum depth. The maximum depth may be individually determined for each frame or slice or for each maximum coding unit.

The encoding depth determiner 120 determines a division shape of the maximum coding unit. The division shape may be determined based on calculation of rate-distortion (RD) costs. The determined division shape of the maximum coding unit is provided to the encoding information encoder 140, and image data according to maximum coding units is provided to the image data encoder 130.

A maximum coding unit may be divided into sub coding units, the sub coding units having different sizes according to different depths, and the sub coding units having the different sizes, which are included in the maximum coding unit, may be predicted or frequency-transformed based on processing units having different sizes. In other words, the apparatus 100 may perform a plurality of processing operations for image encoding based on processing units having various sizes and various shapes. To encode image data, processing operations, such as at least one of prediction, transform, and entropy encoding are performed, wherein processing units having the same size or different sizes may be used for every operation.

For example, the apparatus 100 for encoding an image may select a processing unit that is different from a coding unit to predict the coding unit.

When the size of a coding unit is 2N×2N (where N is a positive integer), processing units for prediction may be 2N×2N, 2N×N, N×2N, and N×N. In other words, motion prediction may be performed based on a processing unit having a shape whereby at least one of height and width of a coding unit is equally divided by two. Hereinafter, a processing unit, which is the base of prediction, is referred to as a prediction unit.

A prediction mode may be at least one of an intra mode, an inter mode, and a skip mode, and a specific prediction mode may be performed for only a prediction unit having a specific size or shape. For example, the intra mode may be performed for only prediction units having the sizes of 2N×2N and N×N, of which the shape is a square. Further, the skip mode may be performed for only a prediction unit having the size of 2N×2N. If a plurality of prediction units exist in a coding unit, the prediction mode with the fewest encoding errors may be selected after performing prediction for every prediction unit.

Alternatively, the apparatus 100 for encoding an image may perform transform on image data based on a processing unit having a size different size from a size of a coding unit. For the transform in the coding unit, the transform may be performed based on a processing unit having a size equal to or smaller than that of the coding unit. Hereinafter, a processing unit, which is the base of transform, is referred to as a transform unit. The transform may be discrete cosine transform (DCT) or Karhunen Loeve transform (KLT) or any other fixed point spatial transform.

The encoding depth determiner 120 may determine sub coding units included in a maximum coding unit using RD optimization based on a Lagrangian multiplier. In other words, the encoding depth determiner 120 may determine shapes of a plurality of sub coding units divided from the maximum coding unit, wherein the plurality of sub coding units have sizes according to their depths. The image data encoder 130 outputs a bitstream by encoding the maximum coding unit based on the division shapes determined by the encoding depth determiner 120.

The encoding information encoder 140 encodes information about an encoding mode of the maximum coding unit determined by the encoding depth determiner 120. In other words, the encoding information encoder 140 outputs a bitstream by encoding information about a division shape of the maximum coding unit, information about the maximum depth, and information about an encoding mode of a sub coding unit for each depth. The information about the encoding mode of the sub coding unit may include information about a prediction unit of the sub coding unit, information about a prediction mode for each prediction unit, and information about a transform unit of the sub coding unit.

The information about the division shape of the maximum coding unit may be information, e.g., flag information, that indicates whether each coding unit is divided. For example, when the maximum coding unit is divided and encoded, information that indicates whether the maximum coding unit is divided is encoded. Also, when a sub coding unit divided from the maximum coding unit is divided and encoded, information that indicates whether the sub coding unit is divided is encoded.

Since sub coding units having different sizes exist for each maximum coding unit, and information about an encoding mode must be determined for each sub coding unit, information that indicates at least one encoding mode may be determined for one maximum coding unit.

The apparatus 100 may generate sub coding units by equally dividing both height and width of a maximum coding unit by two, i.e., quartering the maximum coding unit, according to an increase of depth. That is, when the size of a coding unit of a kth depth is 2N×2N, the size of a coding unit of a (k+1)th depth is N×N.

Accordingly, the apparatus 100 for encoding an image may determine an optimal division shape for each maximum coding unit based on sizes of maximum coding units and a maximum depth, in consideration of image characteristics. By dynamically adjusting the size of a maximum coding unit, in consideration of image characteristics, and encoding an image through division of a maximum coding unit into sub coding units of different depths, images having various resolutions may be more efficiently encoded.

Figure 2:
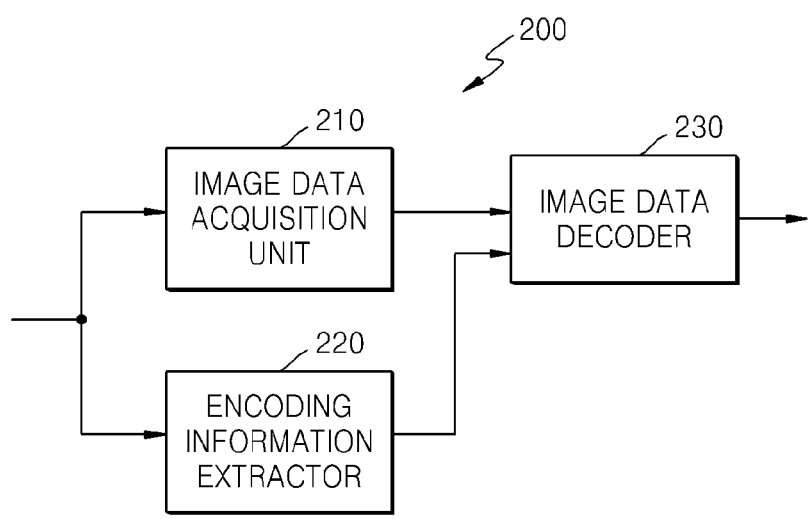
FIG. 2 is a block diagram of an apparatus that decodes an image, according to an exemplary embodiment.

FIG. 2 is a block diagram of an apparatus 200 that decodes an image, according to an exemplary embodiment.

Referring to FIG. 2, the apparatus 200 that decodes an image includes an image data acquisition unit 210, an encoding information extractor 220, and an image data decoder 230.

The image data acquisition unit 210 acquires a bitstream received by the apparatus 200, parses the received bitstream to acquire image data according to maximum coding units, and outputs the image data to the image data decoder 230. The image data acquisition unit 210 may extract information about a maximum coding unit of a current frame or slice from a header of the current frame or slice. In other words, the image data acquisition unit 210 divides the bitstream in the maximum coding unit so that the image data decoder 230 may decode the image data according to maximum coding units.

The encoding information extractor 220 extracts information that indicates a maximum coding unit, information that indicates a maximum depth, information that indicates a division shape of the maximum coding unit, and information that indicates an encoding mode of sub coding units from the header of the current frame by parsing the received bitstream. The information that indicates a division shape and the information that indicates an encoding mode are provided to the image data decoder 230.

The information that indicates a division shape of the maximum coding unit may include information that indicates sub coding units having different sizes according to depths are included in the maximum coding unit, and may be information (e.g., flag information) that indicates whether each coding unit is divided.

The information that indicates an encoding mode may include information about a prediction unit according to sub coding units, information about a prediction mode, and information about a transform unit.

The image data decoder 230 restores the current frame by decoding image data of every maximum coding unit based on the information extracted by the encoding information extractor 220.

The image data decoder 230 may decode sub coding units included in a maximum coding unit based on the information about a division shape of the maximum coding unit. A decoding process may include a prediction process including intra prediction, motion compensation, and an inverse transform process.

The image data decoder 230 may perform intra prediction or inter prediction based on information about a prediction unit and information about a prediction mode in order to predict a prediction unit. The image data decoder 230 may also perform inverse transformation for each sub coding unit based on information about a transform unit of a sub coding unit.

Figure 3:
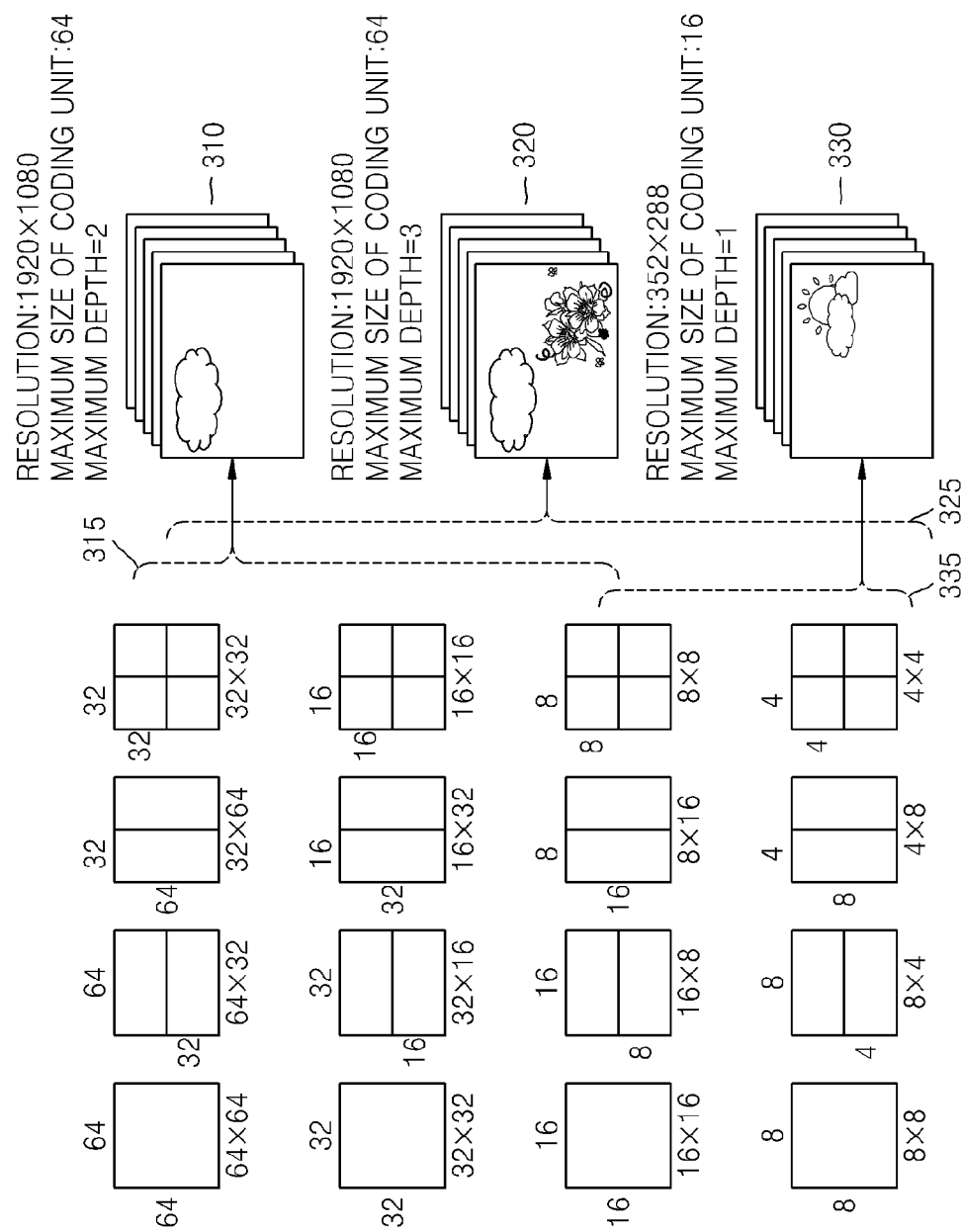
FIG. 3 illustrates hierarchical coding units according to an exemplary embodiment.

FIG. 3 illustrates hierarchical coding units according to an exemplary embodiment.

Referring to FIG. 3, the hierarchical coding units may include coding units whose width×heights are 64×64, 32×32, 16×16, 8×8, and 4×4. Besides these coding units having perfect square shapes, coding units whose width× heights are 64×32, 32×64, 32×16, 16×32, 16×8, 8×16, 8×4, and 4×8 may also exist.

Referring to FIG. 3, for image data 310 whose resolution is 1920×1080, the size of a maximum coding unit is set to 64×64, and a maximum depth is set to 2.

For image data 320 whose resolution is 1920×1080, the size of a maximum coding unit is set to 64×64, and a maximum depth is set to 3. For image data 330 whose resolution is 352×288, the size of a maximum coding unit is set to 16×16, and a maximum depth is set to 2.

When the resolution is high or the amount of data is great, a maximum size of a coding unit may be relatively great to increase a compression ratio and exactly reflect image characteristics. Accordingly, for the image data 310 and 320 having higher resolution than the image data 330, 64×64 may be selected as the size of a maximum coding unit.

A maximum depth indicates the total number of layers in the hierarchical coding units. Since the maximum depth of the image data 310 is 2, a coding unit 315 of the image data 310 may include a maximum coding unit whose longer axis size is 64 and sub coding units whose longer axis sizes are 32 and 16, according to an increase of a depth.

On the other hand, since the maximum depth of the image data 330 is 1, a coding unit 335 of the image data 330 may include a maximum coding unit whose longer axis size is 16 and coding units whose longer axis sizes are 8 and 4, according to an increase of a depth.

However, since the maximum depth of the image data 320 is 3, a coding unit 325 of the image data 320 may include a maximum coding unit whose longer axis size is 64 and sub coding units whose longer axis sizes are 32, 16, 8 and 4 according to an increase of a depth. Since an image is encoded based on a smaller sub coding unit as a depth increases, an exemplary embodiment is suitable for encoding an image including more minute scenes.

Figure 4:
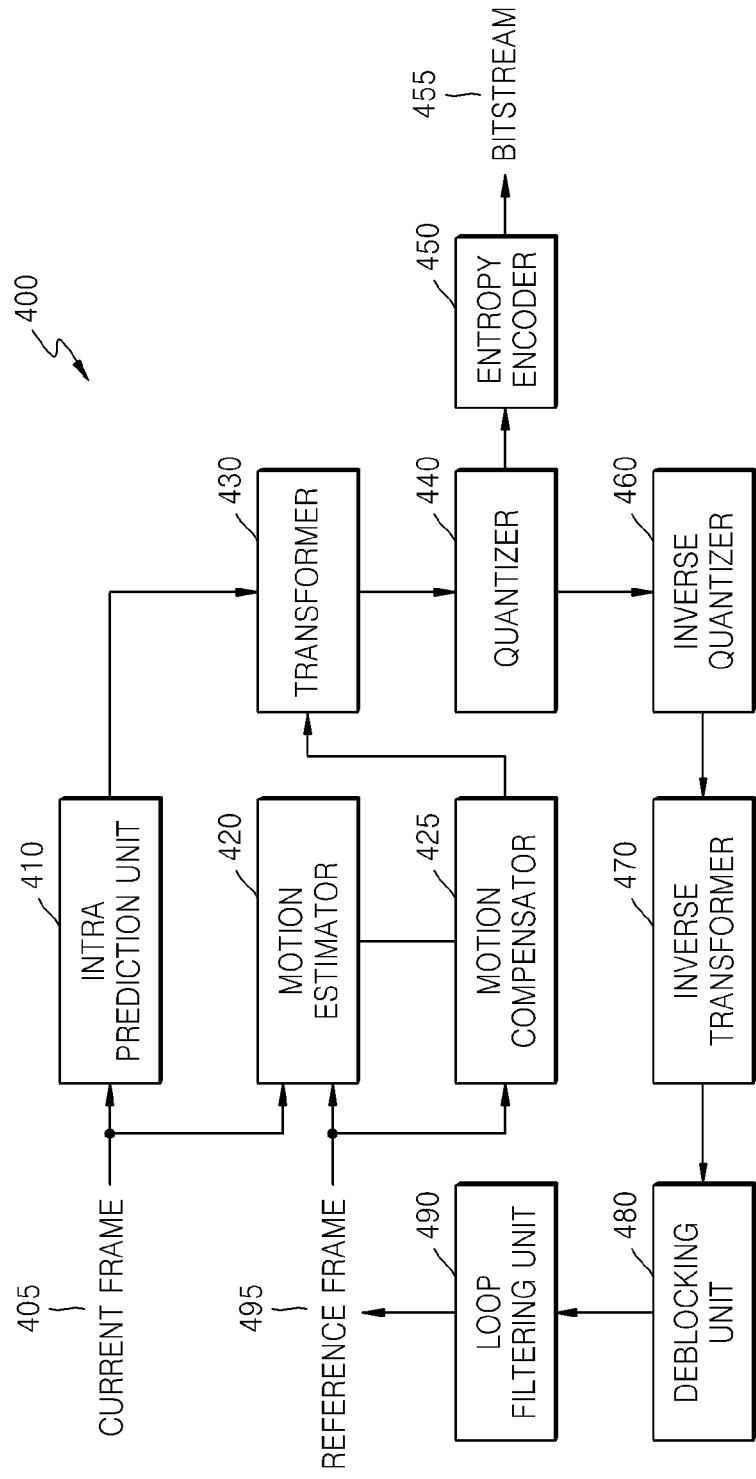
FIG. 4 is a block diagram of an image encoder based on a coding unit, according to an exemplary embodiment.

FIG. 4 is a block diagram of an image encoder 400 based on a coding unit, according to an exemplary embodiment.

An intra prediction unit 410 performs intra prediction on prediction units of the intra mode in a current frame 405. A motion estimator 420 and a motion compensator 425 perform inter prediction and motion compensation on prediction units of the inter mode using the current frame 405 and a reference frame 495.

Residual values are generated based on the prediction units output from the intra prediction unit 410, the motion estimator 420, and the motion compensator 425, and the generated residual values are output as quantized transform coefficients by passing through a transformer 430 and a quantizer 440.

The quantized transform coefficients are restored to residual values by passing through an inverse quantizer 460 and a inverse transformer 470, and the restored residual values are post-processed by passing through a deblocking unit 480 and a loop filtering unit 490 and output as the reference frame 495. The quantized transform coefficients may be output as a bitstream 455 by passing through an entropy encoder 450.

To perform encoding based on an encoding method according to an exemplary embodiment, components of the image encoder 400, i.e., the intra prediction unit 410, the motion estimator 420, the motion compensator 425, the transformer 430, the quantizer 440, the entropy encoder 450, the inverse quantizer 460, the inverse transformer 470, the deblocking unit 480 and the loop filtering unit 490, perform image encoding processes based on a maximum coding unit, a sub coding unit according to depths, a prediction unit, and a transform unit.

Figure 5:
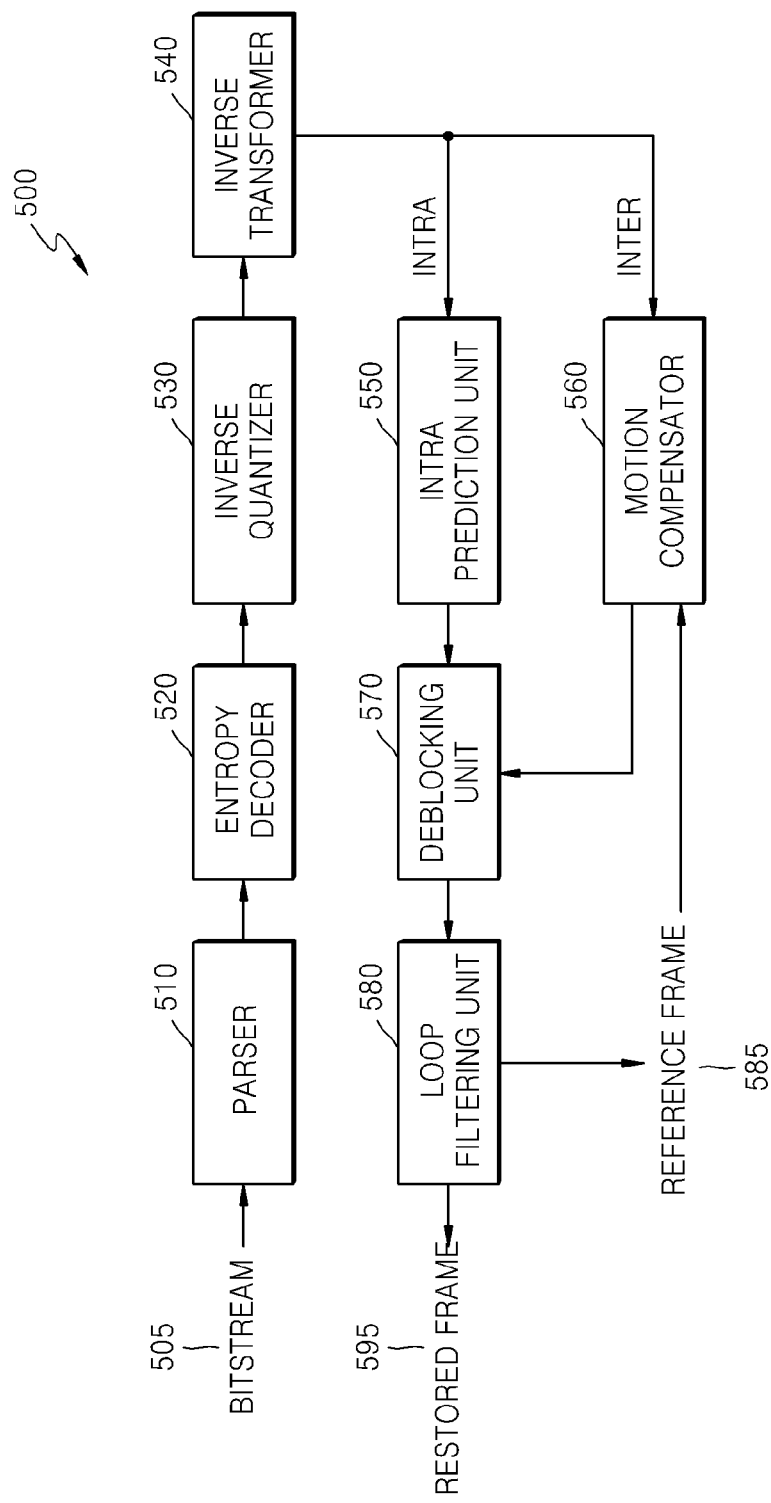
FIG. 5 is a block diagram of an image decoder based on a coding unit, according to an exemplary embodiment.

FIG. 5 is a block diagram of an image decoder 500 based on a coding unit, according to an exemplary embodiment.

Referring to FIG. 5, a bitstream 505 passes through a parser 510, which parses the bitstream to extract encoded image data to be decoded and encoding information necessary for the decoding. The encoded image data is output as inverse-quantized data by passing through an entropy decoder 520 and an inverse quantizer 530, and restored to residual values by passing through an inverse transformer 540. The residual values are restored according to coding units by being added to an intra prediction result of an intra prediction unit 550 or a motion compensation result of a motion compensator 560. The restored coding units are used for prediction of next coding units or a next frame 585, 595 by passing through a deblocking unit 570 and a loop filtering unit 580.

To perform decoding based on a decoding method according to an exemplary embodiment, components of the image decoder 500, i.e., the parser 510, the entropy decoder 520, the inverse quantizer 530, the inverse transformer 540, the intra prediction unit 550, the motion compensator 560, the deblocking unit 570 and the loop filtering unit 580, perform image decoding processes based on a maximum coding unit, a sub coding unit according to depths, a prediction unit, and a transform unit.

In particular, the intra prediction unit 550 and the motion compensator 560 determine a prediction unit and a prediction mode in a sub coding unit by considering a maximum coding unit and a depth, and the inverse transformer 540 performs inverse transform by considering the size of a transform unit.

Figure 6:
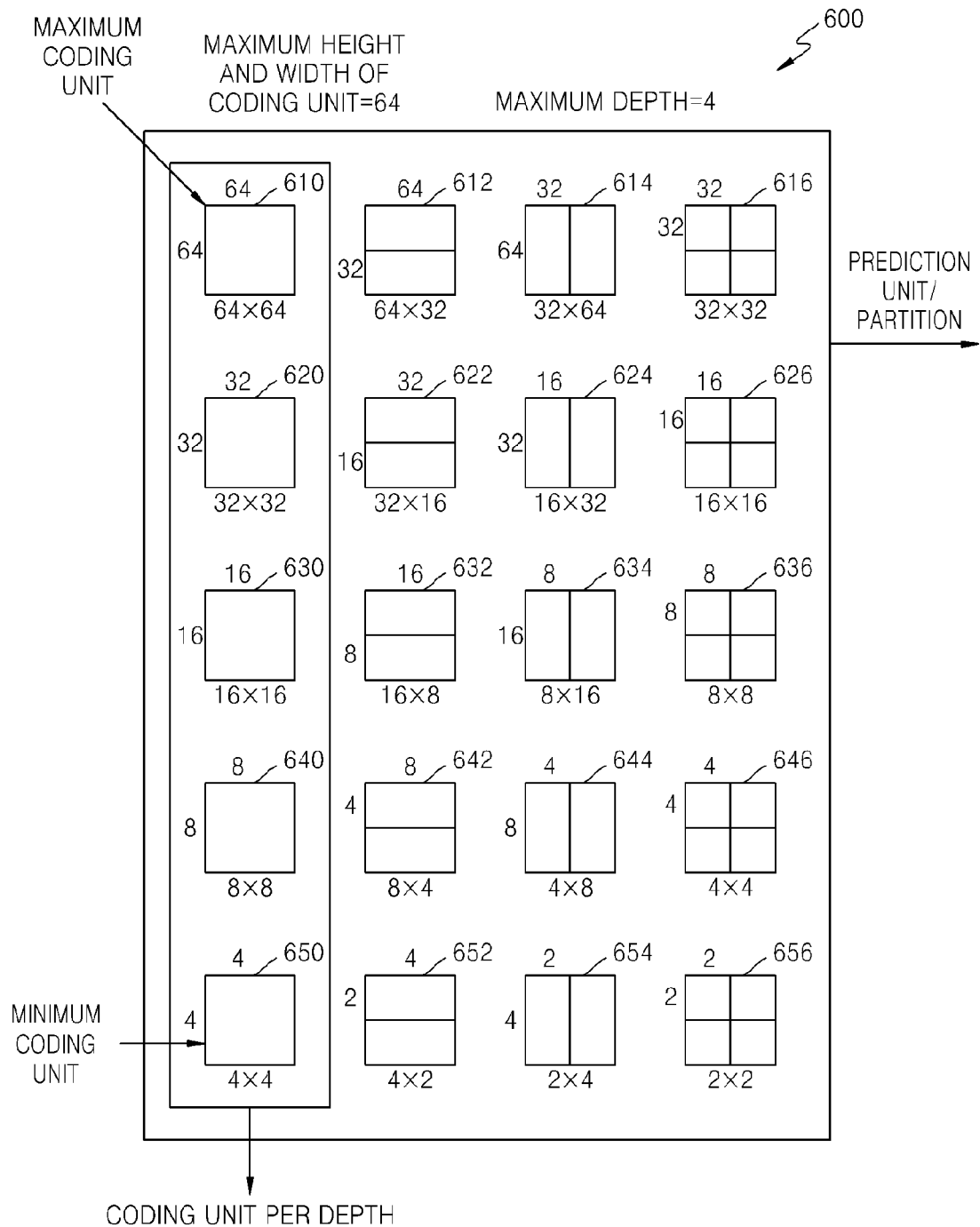
FIG. 6 illustrates a maximum coding unit, a sub coding unit, and a prediction unit, according to an exemplary embodiment.

FIG. 6 illustrates a maximum coding unit, a sub coding unit, and a prediction unit, according to an exemplary embodiment.

The apparatus 100 for encoding an image illustrated in FIG. 1 and the apparatus 200 for decoding an image illustrated in FIG. 2 use hierarchical coding units to perform encoding and decoding in consideration of image characteristics. A maximum coding unit and a maximum depth may be adaptively set according to the image characteristics or set according to input of a user.

In FIG. 6, a hierarchical coding unit structure 600 has a maximum coding unit 610 whose height and width are 64 and maximum depth is 4. A depth increases along a vertical axis of the hierarchical coding unit structure 600, and as a depth increases, heights and widths of sub coding units 620 to 650 decrease. Prediction units of the maximum coding unit 610 and the sub coding units 620 to 650 are shown along a horizontal axis of the hierarchical coding unit structure 600.

The maximum coding unit 610 has a depth of 0 and the size of a coding unit, i.e., height and width, of 64×64. A depth increases along the vertical axis, and there exist a sub coding unit 620 whose size is 32×32 and depth is 1, a sub coding unit 630 whose size is 16×16 and depth is 2, a sub coding unit 640 whose size is 8×8 and depth is 3, and a sub coding unit 650 whose size is 4×4 and depth is 4. The sub coding unit 650 whose size is 4×4 and depth is 4 is a minimum coding unit, and the minimum coding unit may be divided into prediction units, each of which is less than the minimum coding unit.

Referring to FIG. 6, examples of a prediction unit are shown along the horizontal axis according to each depth. That is, a prediction unit of the maximum coding unit 610 whose depth is 0 may be a prediction unit whose size is equal to the coding unit 610, i.e., 64×64, or a prediction unit 612 whose size is 64×32, a prediction unit 614 whose size is 32×64, or a prediction unit 616 whose size is 32×32, which has a size smaller than the coding unit 610 whose size is 64×64.

A prediction unit of the coding unit 620 whose depth is 1 and size is 32×32 may be a prediction unit whose size is equal to the coding unit 620, i.e., 32×32, or a prediction unit 622 whose size is 32×16, a prediction unit 624 whose size is 16×32, or a prediction unit 626 whose size is 16×16, which has a size smaller than the coding unit 620 whose size is 32×32.

A prediction unit of the coding unit 630 whose depth is 2 and size is 16×16 may be a prediction unit whose size is equal to the coding unit 630, i.e., 16×16, or a prediction unit 632 whose size is 16×8, a prediction unit 634 whose size is 8×16, or a prediction unit 636 whose size is 8×8, which has a size smaller than the coding unit 630 whose size is 16×16.

A prediction unit of the coding unit 640 whose depth is 3 and size is 8×8 may be a prediction unit whose size is equal to the coding unit 640, i.e., 8×8, or a prediction unit 642 whose size is 8×4, a prediction unit 644 whose size is 4×8, or a prediction unit 646 whose size is 4×4, which has a size smaller than the coding unit 640 whose size is 8×8.

Finally, the coding unit 650 whose depth is 4 and size is 4×4 is a minimum coding unit and a coding unit of a maximum depth, and a prediction unit of the coding unit 650 may be a prediction unit 650 whose size is 4×4, a prediction unit 652 having a size of 4×2, a prediction unit 654 having a size of 2×4, or a prediction unit 656 having a size of 2×2.

Figure 7:
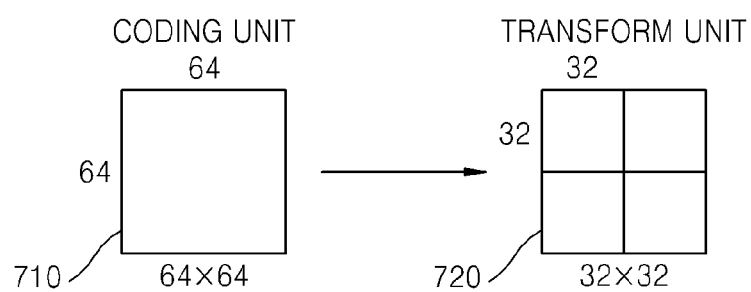
FIG. 7 illustrates a coding unit and a transform unit, according to an exemplary embodiment.

FIG. 7 illustrates a coding unit and a transform unit, according to an exemplary embodiment.

The apparatus 100 for encoding an image illustrated in FIG. 1 and the apparatus 200 for decoding an image illustrated in FIG. 2 perform encoding and decoding with a maximum coding unit or with sub coding units, which are equal to or smaller than the maximum coding unit, divided from the maximum coding unit. In the encoding and decoding process, the size of a transform unit for transform is selected to be no larger than that of a corresponding coding unit. For example, referring to FIG. 7, when a current coding unit 710 has the size of 64×64, transform may be performed using a transform unit 720 having the size of 32×32.

FIGS. 8A through 8D illustrate division shapes of a coding unit, a prediction unit, and a transform unit, according to an exemplary embodiment.

Figure 8A:
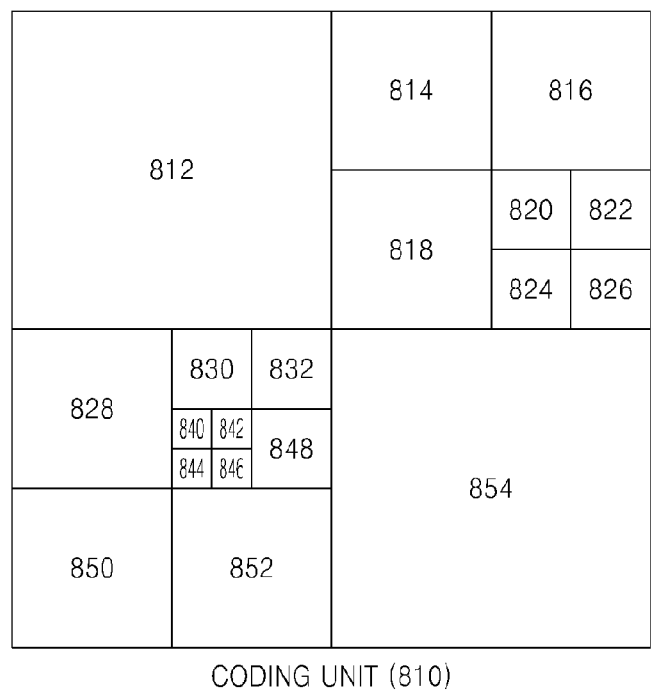
FIGS. 8A through 8D illustrate division shapes of a coding unit, a prediction unit, and a transform unit, according to an exemplary embodiment.
Figure 8B:
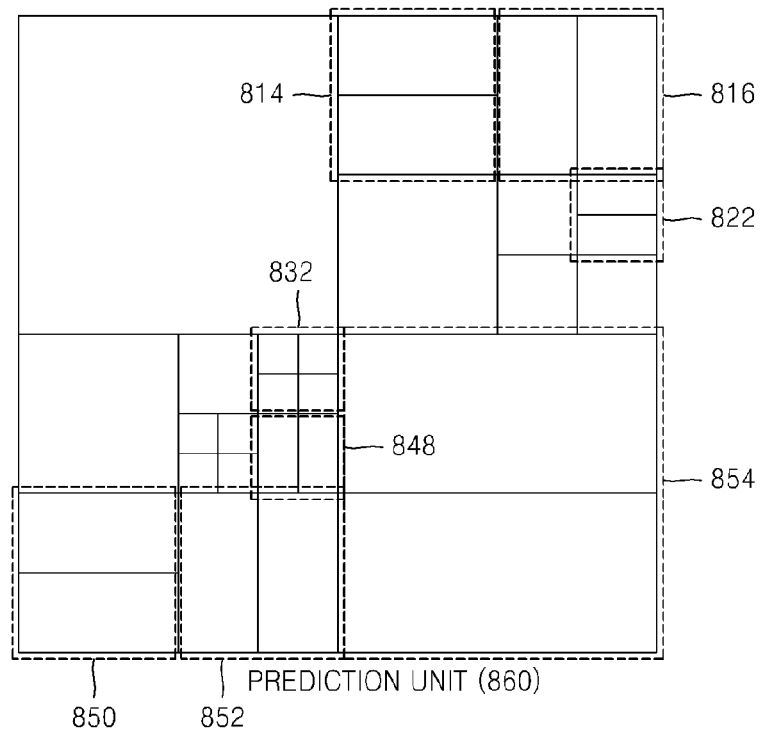

FIGS. 8A and 8B illustrate a coding unit and a prediction unit, respectively, according to an exemplary embodiment.

FIG. 8A shows a division shape selected by the apparatus 100 for encoding an image illustrated in FIG. 1, in order to encode a maximum coding unit 810. The apparatus 100 divides the maximum coding unit 810 into various shapes, performs encoding, and selects an optimal division shape by comparing encoding results of various division shapes with each other based on R-D costs. When it is optimal that the maximum coding unit 810 is encoded, the maximum coding unit 810 may be encoded without dividing the maximum coding unit 810, as illustrated in FIGS. 8A through 8D.

Referring to FIG. 8A, the maximum coding unit 810 whose depth is 0 is encoded by dividing the maximum coding unit 810 into sub coding units whose depths are equal to or greater than 1. That is, the maximum coding unit 810 is divided into 4 sub coding units whose depths are 1, and all or some of the sub coding units whose depths are 1 are divided into sub coding units whose depths are 2.

A sub coding unit located in an upper-right side and a sub coding unit located in a lower-left side among the sub coding units whose depths are 1 are divided into sub coding units whose depths are equal to or greater than 2. Some of the sub coding units whose depths are equal to or greater than 2 may be divided into sub coding units whose depths are equal to or greater than 3.

FIG. 8B shows a division shape of a prediction unit for the maximum coding unit 810.

Referring to FIG. 8B, a prediction unit 860 for the maximum coding unit 810 may be divided in a configuration that is different from the division of the maximum coding unit 810. In other words, a prediction unit for each of sub coding units may be smaller than a corresponding sub coding unit.

For example, a prediction unit for a sub coding unit 854 located in a lower-right side among the sub coding units whose depths are 1 may be smaller than the sub coding unit 854. In addition, prediction units for some sub coding units 814, 816, 850, and 852 from among sub coding units 814, 816, 818, 828, 850, and 852 whose depths are 2 may be smaller than the sub coding units 814, 816, 850, and 852, respectively.

In addition, prediction units for sub coding units 822, 832, and 848 whose depths are 3 may be smaller than the sub coding units 822, 832, and 848, respectively. The prediction units may have a shape whereby respective sub coding units are equally divided by two in a direction of height or width or have a shape whereby respective sub coding units are equally divided by four in directions of height and width.

Figure 8C:
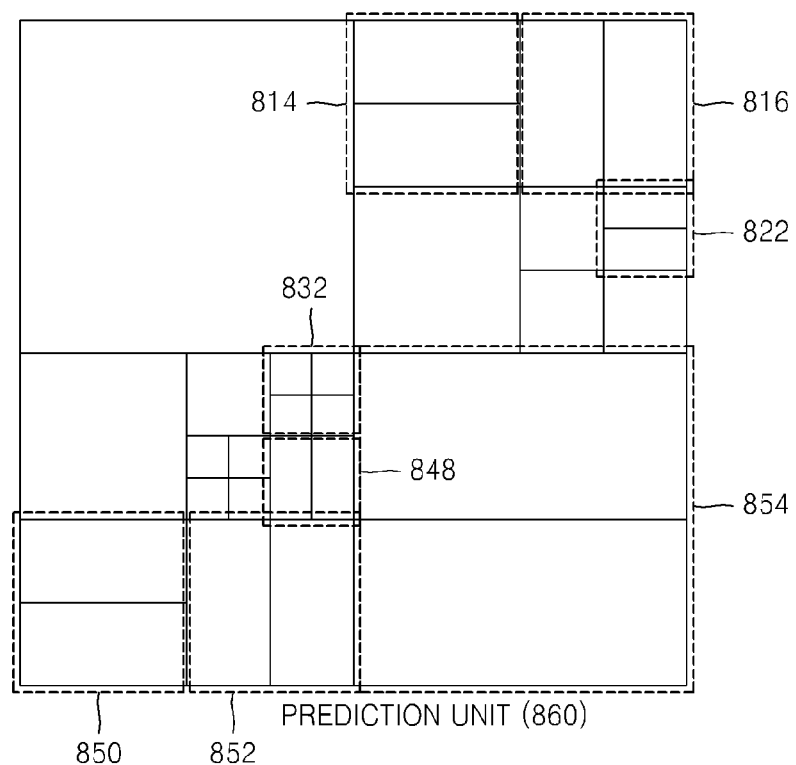
Figure 8D:
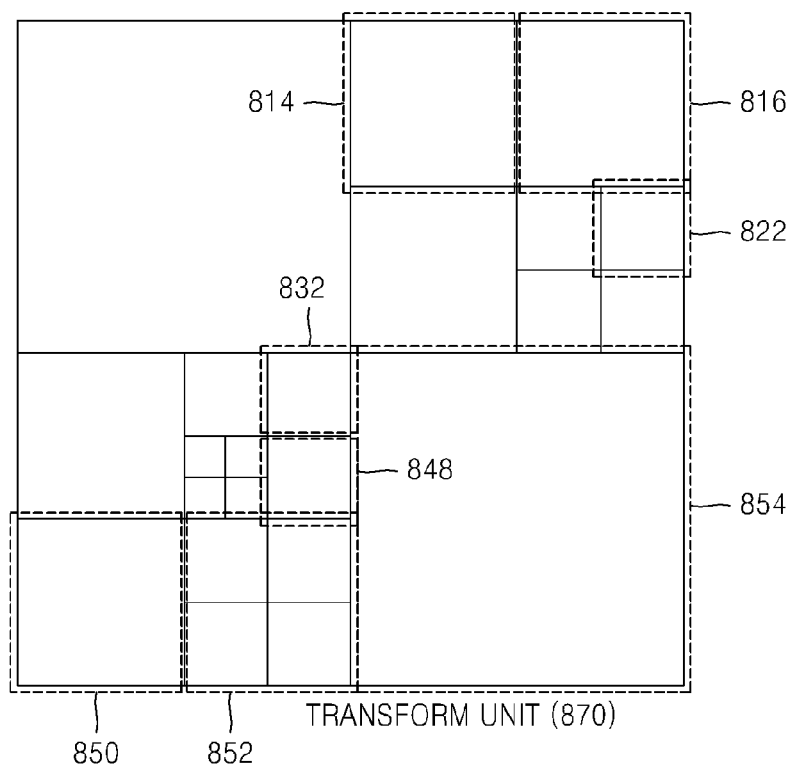

FIGS. 8C and 8D illustrate a prediction unit and a transform unit, respectively, according to an exemplary embodiment.

FIG. 8C shows a division shape of a prediction unit for the maximum coding unit 810 shown in FIG. 8B, and FIG. 8D shows a division shape of a transform unit of the maximum coding unit 810.

Referring to FIG. 8D, a division shape of a transform unit 870 may be set differently from the prediction unit 860.

For example, even though a prediction unit for the coding unit 854 whose depth is 1 is selected with a shape whereby the height of the coding unit 854 is equally divided by two in FIG. 8C, a transform unit may be selected with the same size as the coding unit 854 in FIG. 8D. That is, the size and shape of the coding unit 854 in FIG. 8A is the same as the size and the shape of the transform unit 854 in FIG. 8D, but the size and the shape of the prediction unit 854 in FIGS. 8B and 8C is different than the size and the shape of the coding unit 854 in FIG. 8A and the transform unit in FIG. 8D. Likewise, even though prediction units for coding units 814 and 850 whose depths are 2 are selected with a shape whereby the height of each of the coding units 814 and 850 is equally divided by two, a transform unit may be selected with the same size as the original size of each of the coding units 814 and 850.

A transform unit may be selected with a smaller size than a prediction unit. For example, when a prediction unit for the coding unit 852 whose depth is 2 is selected with a shape whereby the width of the coding unit 852 is equally divided by two, a transform unit may be selected with a shape whereby the coding unit 852 is equally divided by four in directions of height and width, which has a smaller size than the shape of the prediction unit.

Figure 9:
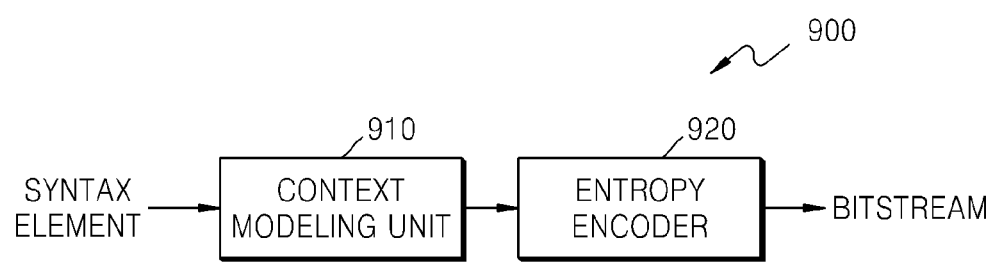
FIG. 9 is a block diagram of an entropy-encoding apparatus, according to an exemplary embodiment.

FIG. 9 is a block diagram of an entropy-encoding apparatus 900, according to an exemplary embodiment.

Referring to FIG. 9, the entropy-encoding apparatus 900 includes a context modeling unit 910 and an entropy encoder 920. The entropy-encoding apparatus 900 may correspond to the entropy encoder 450 illustrated in FIG. 4.

The context modeling unit 910 sets a context model for entropy-encoding data about a current block. Data about the current block includes various syntax elements regarding information that indicates a method of encoding the current block and residual data. Information that indicates the method of encoding the current block may be header information for describing the method of encoding the current block, such as information that indicates a block type, information that indicates a prediction mode, or the like, and residual data may be information that indicates transform coefficients generated by performing transform on residual values, such as a coded block pattern (CBP), a significance map, level information, or the like.

Entropy-encoding and entropy-decoding is separately performed on a syntax element. In detail, a context index is calculated using a different context function for each syntax element, and entropy-encoding and entropy-decoding is performed using context-based adaptive binary arithmetic coding (CABAC) or context-based adaptive variable length coding (CAVLC). Thus, hereinafter, entropy-encoding or entropy-decoding of the current block refers to entropy-encoding or entropy-decoding with respect to a predetermined syntax element of the current block, and the predetermined syntax element refers to one from among various syntax elements.

A related art codec, such as Moving Pictures Experts Group (MPEG)-4 H.264/MPEG-4 Advanced Video Coding (AVC), performs context modeling by referring to a syntax element of a previously encoded block that is adjacent to the current block, so as to entropy-encode the predetermined syntax element of the current block. Context modeling refers to the setting of a context model used to entropy-encode the current block, and an operation of setting the context model includes an operation of calculating the context index.

However, when the current block is entropy-encoded by referring to the syntax element of the previously encoded block, frequent access to a memory occurs. In addition, since, in order to refer to the syntax element of the previously encoded block, the syntax element should be continuously stored in the memory, and hence a large capacity memory is needed for entropy-encoding. The context modeling unit 910 does not repeatedly perform context modeling when all blocks are entropy-encoded, but sets a context unit that is a unit for performing context modeling, by grouping a predetermined number of blocks, and performs the context modeling on the context unit only once. This will be described in detail with reference to FIGS. 10 and 11.

Figure 10:
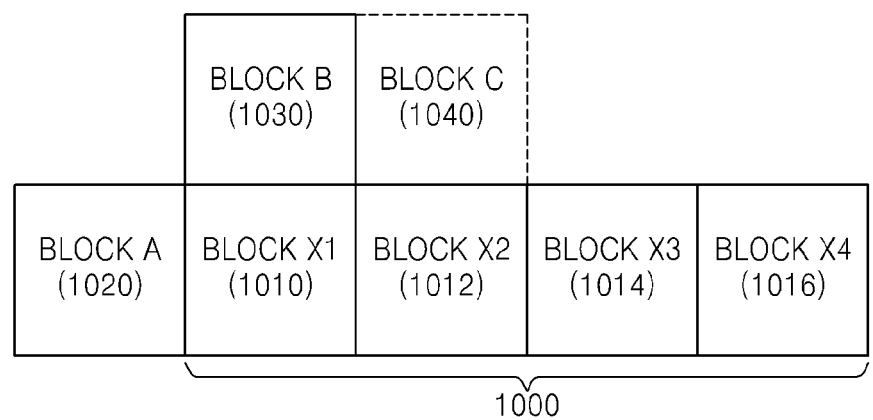
FIG. 10 illustrates a method of sharing a context model, according to an exemplary embodiment.

FIG. 10 illustrates a method of sharing a context model, according to an exemplary embodiment.

A related art codec, such as MPEG-4 H.264/MPEG-4 AVC, refers to a previously encoded block that is adjacent to the left side of a current block and/or a previously encoded block that is adjacent to the upper side of the current block, so as to entropy-encode the current block. In other words, in order to entropy-encode a syntax element A of a block X1 1010, a syntax element A of a previously encoded block A 1020 that is adjacent to the left side of the block X1 1010 and/or a syntax element A of a previously encoded block B 1030 that is adjacent to the upper side of the block X1 1010 is substituted for a predetermined context function, and a context index for entropy-encoding the syntax element A of the block X1 1010 is calculated based on the substitution. The context function is a function for determining the context index and may be determined for each syntax element.

In addition, in the related art codec, when entropy-encoding of the block X1 1010 is completed and a syntax element of a block X2 1012 is entropy-encoded, the syntax element A of the previously encoded block X1 1010 adjacent to the block X2 1012 and a syntax element A of a block C 1040 are substituted for the context function so that the context index can be calculated based on the substitution.

However, the context modeling unit 910 groups the block X1 1010, the block X2 1012, a block X3 1014, and a block X4 1016 into one context unit 1000, and performs context modeling on the one context unit 1000. For example, when a predetermined context index is calculated by performing context modeling on the block X1 1010 that is initially encoded in the context unit 1000, the context modeling unit 910 does not separately calculate context indexes of the other blocks 1012 through 1016 of the context unit 1000 for performing context modeling. The context indexes of other blocks 1012 through 1016 in the context unit 1000 are set to be the same as, i.e., equal to, the context index of the block X1 1010.

Context modeling does not need to be repeatedly performed to entropy-encode the block X2 1012, and the block X2 1012 may be entropy-encoded by using the context index that is used to entropy-encode the block X1 1010. There is no limitation in setting the context unit 1000, and all methods of grouping continuously-encoded blocks into one group may be used to set the context unit 1000. Information that indicates a method of setting the context unit 1000 may be encoded together with the result of entropy-encoding and may be inserted in image data. However, when the context unit 1000 is set by an encoder and a decoder by using a same method, it may be unnecessary to encode information that indicates the method of setting the context unit 1000.

Since context modeling is performed on four blocks in the context unit 1000, as illustrated in FIG. 10, a delay is prevented from occurring when context modeling is performed, and entropy-encoding may be performed at a higher speed. In addition, since there is a high probability that adjacent blocks may have similar characteristics, even though the adjacent blocks share a context index and are entropy-encoded, the compression ratio of encoding is not lowered.

Figure 11:
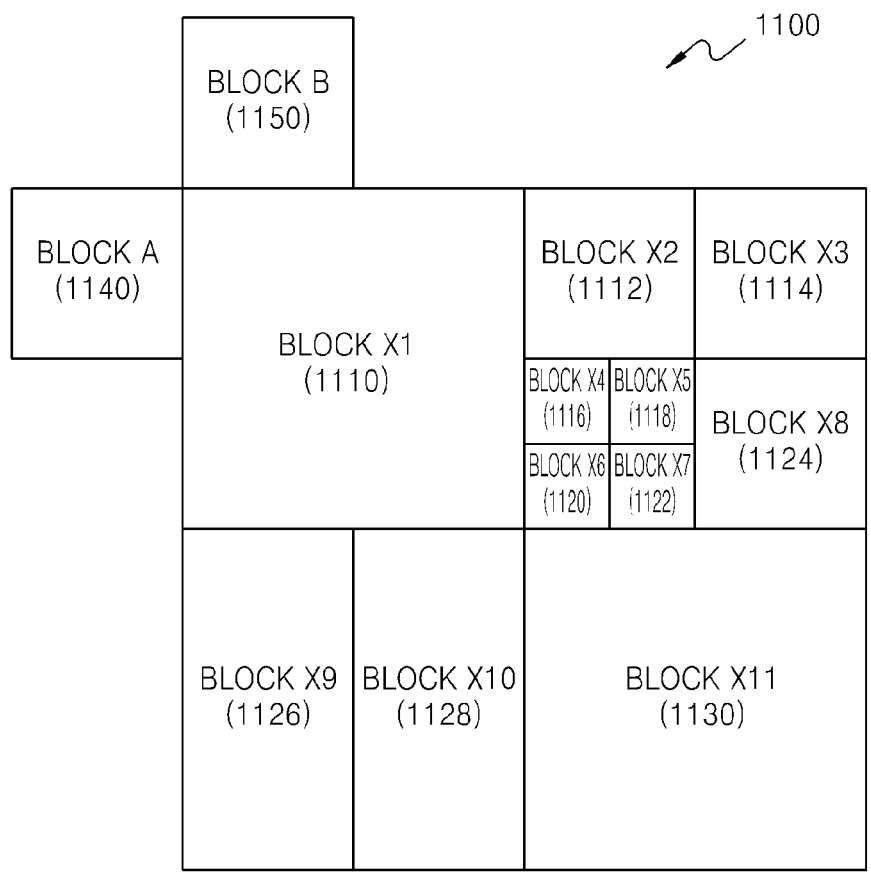
FIG. 11 illustrates a method of sharing a context model, according to an exemplary embodiment.

FIG. 11 illustrates a method of sharing a context model, according to an exemplary embodiment.

Referring to FIG. 11, a context unit 1100, which is a unit for performing context modeling, may be set to be the same as the maximum coding unit described above with reference to FIGS. 1 through 8. In other words, to entropy-encode blocks 1110 through 1130 illustrated in FIG. 11, the context modeling unit 910 performs context modeling only once.

In order to entropy-encode a syntax element A of a block X1 1110 that is initially encoded in the maximum coding unit, a syntax element A of a block A 1140 and a syntax element A of a block B 1150 are substituted for a predetermined context function, and a context index of the block X1 1110 is calculated based on the substitution. Then, context indexes for entropy-encoding syntax elements A of the other blocks 1112 through 1130 are set to be the same as the context index of the block X1 1110. Context modeling is performed on a plurality of blocks 1110 through 1130 included in the maximum coding unit only once to prevent inefficiency due to frequent context modeling.

Referring back to FIG. 9, the entropy encoder 920 entropy-encodes data about the current block based on the context model set by the context modeling unit 910, thereby generating a bitstream. The entropy encoder 920 entropy-encodes the predetermined syntax element of the current block.

When the current block is an initial block of a context unit 1000 or 1100, the context modeling unit 910 sets a context model for entropy-encoding the current block based on at least one previously encoded block that is adjacent to the current block, and the entropy encoder 920 entropy-encodes the current block according to the set context model.

When the current block is not an initial block 1010 or 1110 of the context unit 1000 or 1100, the context modeling unit 910 sets a context model for entropy-encoding the current block to be the same as the context model used to entropy-encode the initial block 1010 or 1110, and the entropy encoder 920 entropy-encodes the current block according to the set context model. Entropy-encoding is context-based adaptive entropy-encoding, and context-based adaptive entropy-encoding includes CABAC and/or CAVLC.

With respect to CABAC, the entropy encoder 920 performs arithmetic coding based on information about a most probable symbol corresponding to the context index calculated by the context modeling unit 910 and on information about an occurrence probability of the most probable symbol. When the context index is set in the context unit 1000 or 1100, the most probable symbol corresponding to the context index and the occurrence probability of the most probable symbol are determined. The entropy encoder 920 performs arithmetic coding on all blocks of the context unit 1000 or 1100 based on the determined most probable symbol and the determined occurrence probability of the most probable symbol.

When entropy-encoding of the current block is completed, the entropy encoder 920 may update at least one of the most probable symbol and the occurrence probability of the most probable symbol. If the most probable symbol has been changed according to the result of entropy-encoding of the current block, the entropy encoder 920 changes information about the most probable symbol corresponding to the context index set by the context modeling unit 910. In addition, the entropy encoder 920 updates the occurrence probability of the most probable symbol corresponding to the context index set by the context modeling unit 910 according to the result of entropy-encoding of the current block.

Updating may be performed whenever a block is entropy-encoded or in each predetermined updating period. When updating is performed in each predetermined updating period, the entropy encoder 920 may perform updating based on the result of entropy-encoding of a predetermined block of the context unit 1000 or 1100. In the case of the context unit 1000 of FIG. 10, the entropy encoder 920 may entropy-encode the initial block 1010 of the context unit 1000 and then may perform updating based on the result of entropy-encoding, or the entropy encoder 920 may entropy-encode the last block 1016 of the context unit 1000 and then may perform updating based on the result of entropy-encoding.

In CAVLC, the entropy encoder 920 may select a variable length coding table based on the context model set by the context modeling unit 910. According to CAVLC, the variable length coding table for entropy-encoding the current block may be selected by referring to a previously encoded block adjacent to the left-side of a current block and a previously encoded block adjacent to the upper-side of the current block. For more efficient variable length coding, one from among a plurality of variable length coding tables may be selected by referring to previously encoded blocks so that entropy-encoding adaptive to a context can be performed.

However, according to the exemplary embodiment, since context modeling is performed on the context unit 1000 or 1100 only once, not by repeatedly selecting the variable length coding table for each block but by selecting the variable length coding table for all blocks included in the context unit 1000 or 1100 only once, the entropy encoder 920 entropy-encodes the current block according to the variable length coding table selected in the context unit 1000 or 1100.

Figure 12:
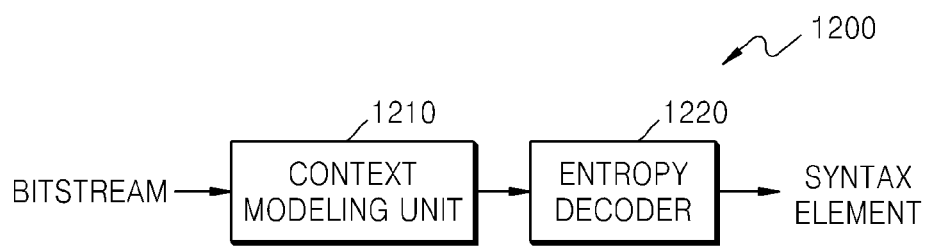
FIG. 12 is a block diagram of an entropy-decoding apparatus, according to an exemplary embodiment.

FIG. 12 is a block diagram of an entropy-decoding apparatus 1200, according to an embodiment of the present invention.

Referring to FIG. 12, the entropy-decoding apparatus 1200 according to an exemplary embodiment includes a context modeling unit 1210 and an entropy decoder 1220. The entropy-decoding apparatus 1200 may correspond to the entropy decoder 520 illustrated in FIG. 5. The entropy-decoding apparatus 1200 of FIG. 12 is an apparatus for reversing the entropy-encoding of the entropy-encoding apparatus 900 described above with reference to FIGS. 9 through 11.

The context modeling unit 1210 sets a context model for entropy-decoding a bitstream with respect to a current block. The bitstream with respect to the current block is a bitstream generated by entropy-encoding various syntax elements including information that indicates a method of encoding the current block and residual data.

Context modeling for entropy-decoding is an operation corresponding to context modeling for entropy-encoding. Thus, when the current block is an initially entropy-decoded block 1010 or 1110 in the context unit 1000 or 1100, the context modeling unit 1210 sets a context model for entropy-decoding the current block based on at least one previously decoded block that is adjacent to the current block. In addition, when the current block is not an initially entropy-encoded block 1010 or 1110 in the context unit 1000 or 1100, the context modeling unit 1210 sets a context model to be the same as the context model of the initially entropy-decoded block 1010 or 1110 of the context unit 1000 or 1100. The context model may be a context index, as described above. There is no limitation to a method of setting a context unit. However, the context unit 1100 may be set to be the same as the maximum coding unit, as described above with reference to FIG. 11.

The entropy decoder 1220 entropy-decodes the current block according to the context model set by the context modeling unit 1210. The entropy decoder 1220 performs context-based adaptive entropy-decoding on the current block according to the context index calculated by the context modeling unit 1210. Context-based adaptive entropy decoding includes context-based adaptive binary arithmetic decoding or context-based adaptive variable length decoding.

When the current block is an initial block of the context unit 1000 or 1100, the context modeling unit 1210 sets a context model for entropy-decoding the current block based on at least one previously decoded block that is adjacent to the current block, and the entropy decoder 1220 entropy-decodes the current block according to the set context model.

When the current block is not an initial block 1010 or 1110 of the context unit 1000 or 1100, the context modeling unit 1210 sets a context model for entropy-decoding the current block to be the same as the context model used to entropy-decode the initial block 1010 or 1110, and the entropy decoder 1220 entropy-decodes the current block according to the set context model.

In context-based adaptive binary arithmetic decoding, the entropy decoder 1220 performs arithmetic decoding based on information that indicates a most probable symbol corresponding to the context index calculated by the context modeling unit 1210 and information that indicates an occurrence probability of the most probable symbol. When the context index is set as the context unit 1000 or 1100, the most probable symbol corresponding to the context index and the occurrence probability of the most probable symbol are determined.

The entropy decoder 1220 performs entropy-decoding on all blocks of the context unit 1000 or 1100 based on the determined most probable symbol and the determined occurrence probability of the most probable symbol.

When entropy-decoding of the current block is completed, the entropy decoder 1220 may update at least one of the most probable symbol and the occurrence probability of the most probable symbol. If the most probable symbol has been changed according to the result of entropy-decoding of the current block, the entropy decoder 1220 changes information that indicates the most probable symbol corresponding to the context index set by the context modeling unit 1210. In addition, the entropy decoder 1220 updates the occurrence probability of the most probable symbol corresponding to the context index set by the context modeling unit 1210 according to the result of entropy-decoding of the current block. Updating is performed in the same manner as the entropy encoder 920. In other words, updating may be performed whenever entropy-decoding is performed or in each predetermined updating period.

In context-based adaptive variable length decoding, the entropy decoder 1220 may select a variable length decoding table based on the context model set by the context modeling unit 1210. Since context modeling is performed on the context unit 1000 or 1100 only once, selecting of the variable length decoding table is not repeatedly performed on all blocks, but the variable length decoding table is selected on all blocks included in the context unit 1000 or 1100 only once, so that the entropy decoder 1220 can perform entropy-decoding on the current block according to the variable length decoding table selected in the context unit 1000 or 1100.

Figure 13:
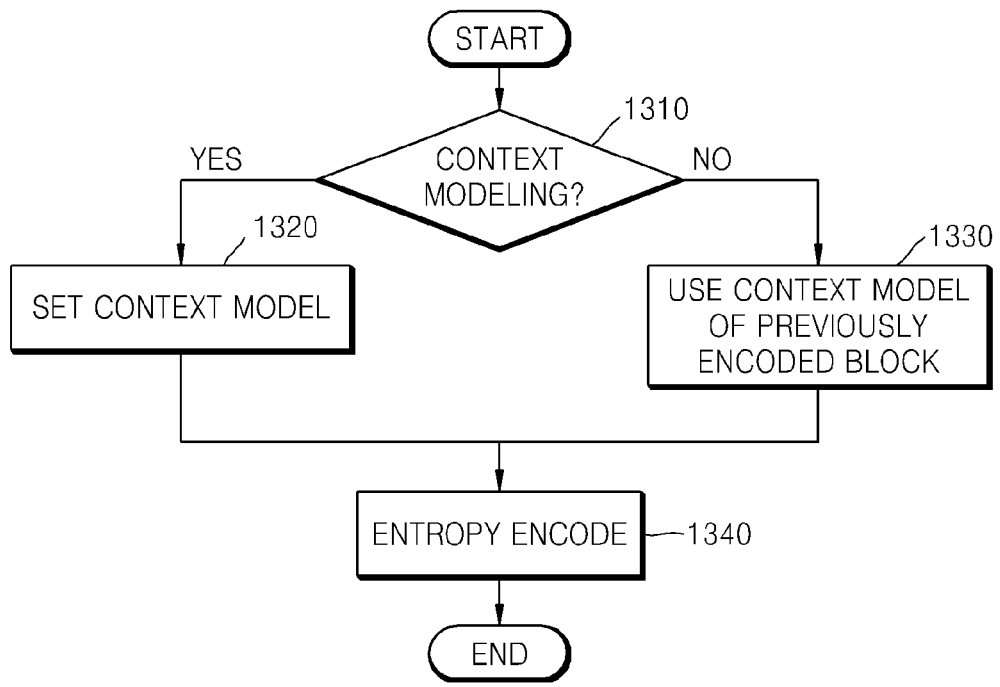
FIG. 13 is a flowchart illustrating an entropy-encoding method, according to an exemplary embodiment.

FIG. 13 is a flowchart illustrating an entropy-encoding method, according to an exemplary embodiment.

Referring to FIG. 13, in operation 1310, the entropy-encoding apparatus 900 of FIG. 9 determines whether context modeling is performed so as to entropy-encode the current block. When the current block is an initially entropy-encoded block in the context unit 1000 or 1100, context modeling should be performed so as to entropy-encode a predetermined syntax element of the current block, and when the current block is not an initially entropy-encoded block in the context unit 1000 or 1100, context modeling does not need to be performed.

As the result of determination in operation 1310, if it is determined that context modeling needs to be performed for entropy-encoding of the current block, in operation 1320, the entropy-encoding apparatus 900 sets a context model for entropy-encoding of the current block. The entropy-encoding apparatus 900 substitutes a syntax element of at least one previously encoded block that is adjacent to the current block for a predetermined context function, thereby calculating a context index.

As the result of determination in operation 1310, if it is determined that context modeling does not need to be performed for entropy-encoding of the current block, in operation 1330, the entropy-encoding apparatus 900 sets a context model of the current block to be the same as a context model of a previously encoded block that is adjacent to the current block. The context index for entropy-encoding of the current block may be set to be the same as the context index of the initially entropy-encoded block 1010 or 1110 in the context unit 1000 or 1100 including the current block.

In operation 1340, the entropy-encoding apparatus 900 entropy-encodes the current block according to the context model set in operation 1320 or 1330. Entropy-encoding may be CABAC or CAVLC.

Figure 14:
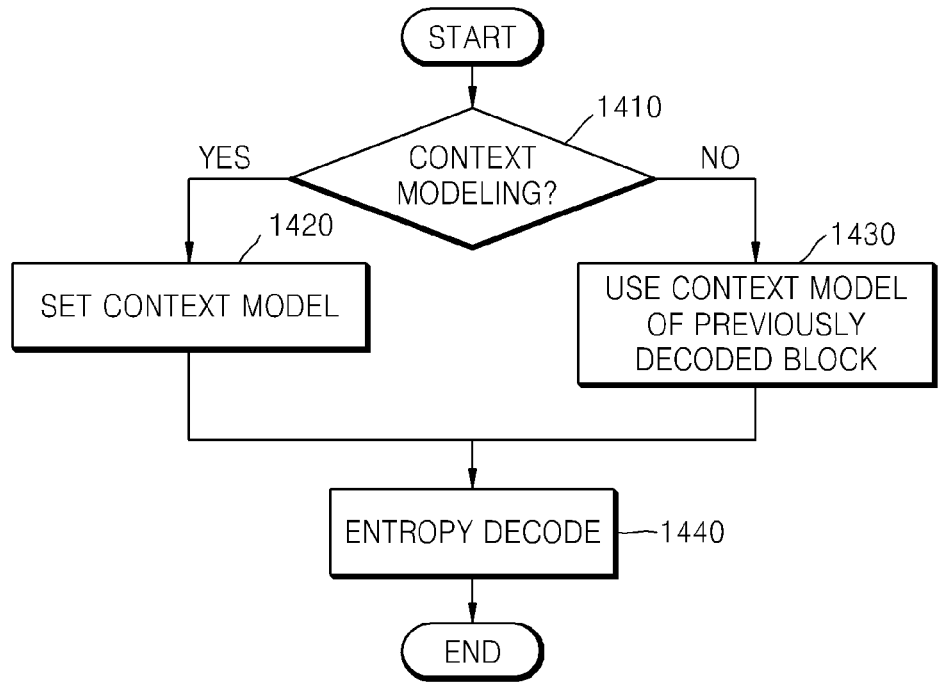
FIG. 14 is a flowchart illustrating an entropy-decoding method, according to an exemplary embodiment.

FIG. 14 is a flowchart illustrating an entropy-decoding method, according to an exemplary embodiment.

Referring to FIG. 14, in operation 1410, the entropy-decoding apparatus 1200 of FIG. 12 determines whether context modeling is performed so as to entropy-decode the current block. When the current block is an initially entropy-decoded block in the context unit 1000 or 1100, context modeling should be performed so as to entropy-decode a predetermined syntax element of the current block, and when the current block is not an initially entropy-decoded block in the context unit 1000 or 1100, context modeling does not need to be performed.

As the result of determination in operation 1410, if it is determined that context modeling needs to be performed for entropy-decoding of the current block, in operation 1420, the entropy-decoding apparatus 1200 sets a context model for entropy-decoding of the current block. The entropy-decoding apparatus 900 substitutes a syntax element of at least one previously decoded block that is adjacent to the current block for a predetermined context function, thereby calculating a context index.

As the result of determination in operation 1410, if it is determined that context modeling does not need to be performed for entropy-decoding of the current block, in operation 1430, the entropy-decoding apparatus 900 sets a context model of the current block to be the same as a context model of a previously decoded block that is adjacent to the current block. The context index for entropy-decoding of the current block may be set to be the same as the context index of the initially entropy-decoded block 1010 or 1110 in the context unit 1000 or 1100 including the current block.

In operation 1440, the entropy-decoding apparatus 1200 entropy-decodes the current block according to the context model set in operation 1420 or 1430. Entropy-decoding may be context-based adaptive binary arithmetic decoding or context-based adaptive variable length decoding.

As described above, image data may be entropy-encoded or entropy-decoded at a high speed by using lower complexity hardware while the compression rate of an image during encoding is not greatly lowered.

While the exemplary embodiments been particularly shown and described with reference to the figures, it will be understood by one of ordinary skill in the art that various changes in form and details may be made therein without departing from the spirit and scope of the invention as defined by the following claims and their equivalents.

The apparatus for encoding an image, the apparatus for decoding an image, the entropy-encoding apparatus and the entropy-decoding apparatus illustrated in FIGS. 1, 2, 4, 5, 9, and 12 may include a bus coupled to every unit of the apparatus or coder, at least one processor that is connected to the bus, the processor for executing commands, and a memory connected to the bus to store the commands, received messages, and generated messages.

The exemplary embodiments may also be embodied as computer readable codes on a computer readable recording medium. The computer readable recording medium is any data storage device that can store data which can be thereafter read by a computer system to execute the computer readable codes. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Alternatively, the exemplary embodiments may be embodied as computer readable transmission media, such as signals or carrier waves, for transmission over a network, such as the Internet.

What is claimed is:

1. A method of entropy-decoding image data, the method comprising:
   entropy-decoding a syntax element of a first block at a first position within a layer by using first probability information;
   obtaining second probability information by updating the first probability information; and
   entropy-decoding a syntax element of a second block at a second position within the layer and a syntax element of a third block at a third position within the layer by using the second probability information,
   wherein the first block is decoded prior to the second block and the third block, and
   wherein the second position within the layer of the second block and the third position within the layer of the third block are spatially separated positions from each other within the layer,
   wherein the layer is one of layers included in an image, and
   wherein the second probability information is obtained by updating at least one of information that indicates a most probable symbol and information that indicates the occurrence probability of the most probable symbol included in the first probability information.

* * * * *